Oct. 8, 1940.                J. PLEBANSKI                2,216,829
                          ELECTRICAL SYSTEM
                     Filed April 11, 1936      2 Sheets-Sheet 1
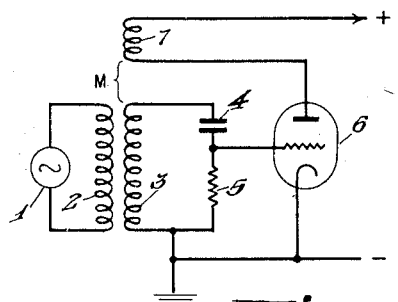
Fig:1
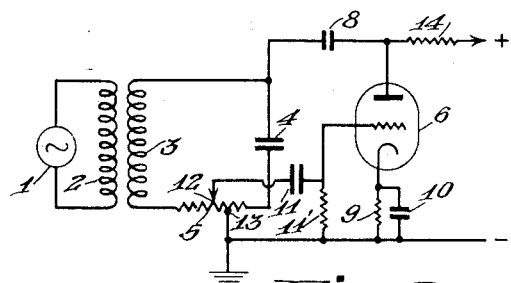
Fig:2
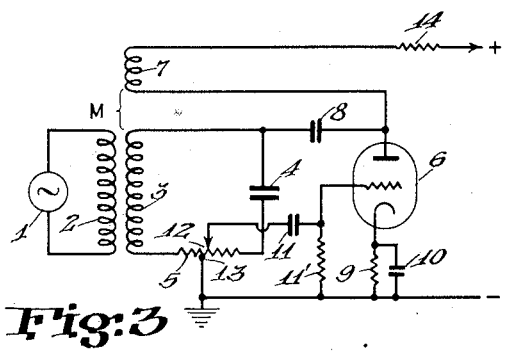
Fig:3
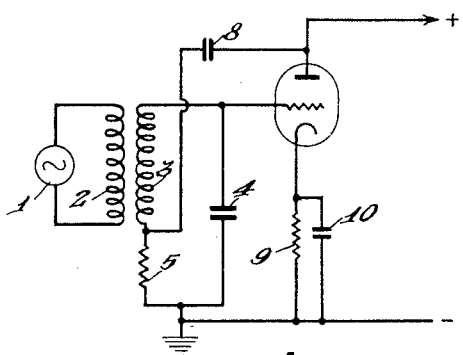
Fig:4
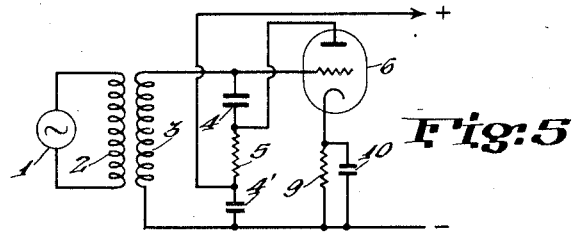
Fig:5
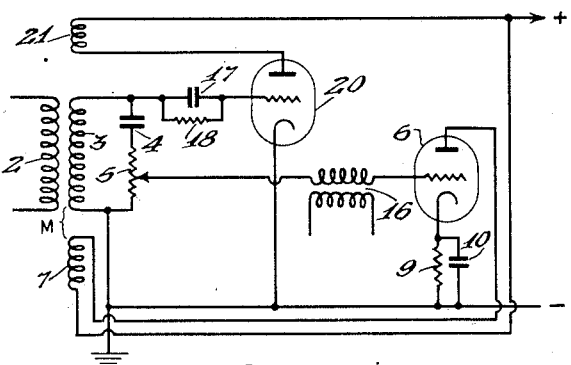
Fig:7
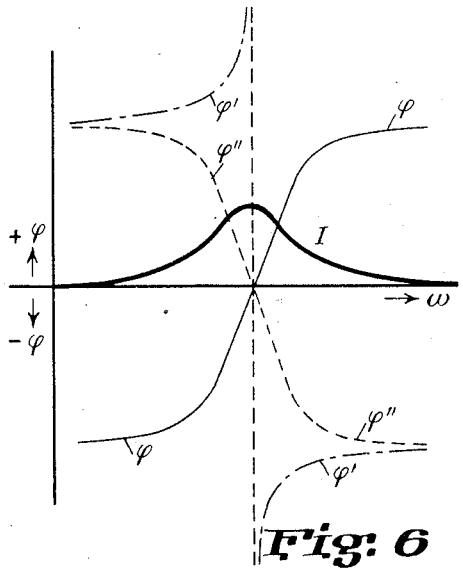
Fig:6
INVENTOR.
BY Jozef Plebanski
ATTORNEY.

Oct. 8, 1940.  J. PLEBANSKI  2,216,829
ELECTRICAL SYSTEM
Filed April 11, 1936  2 Sheets-Sheet 2
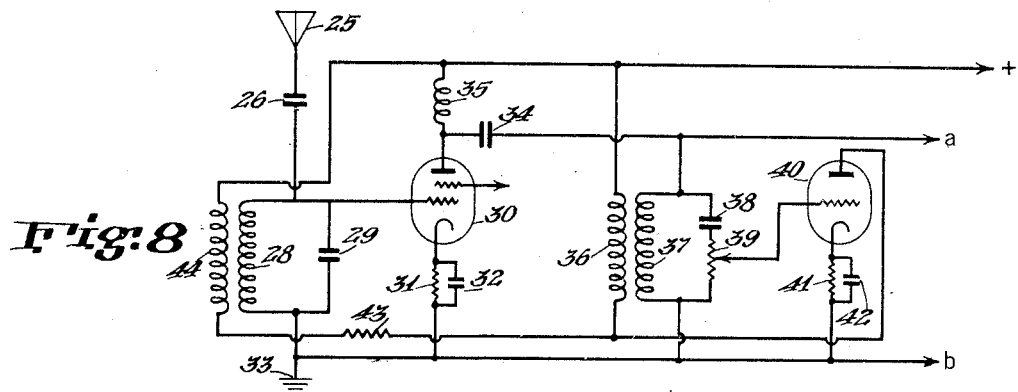
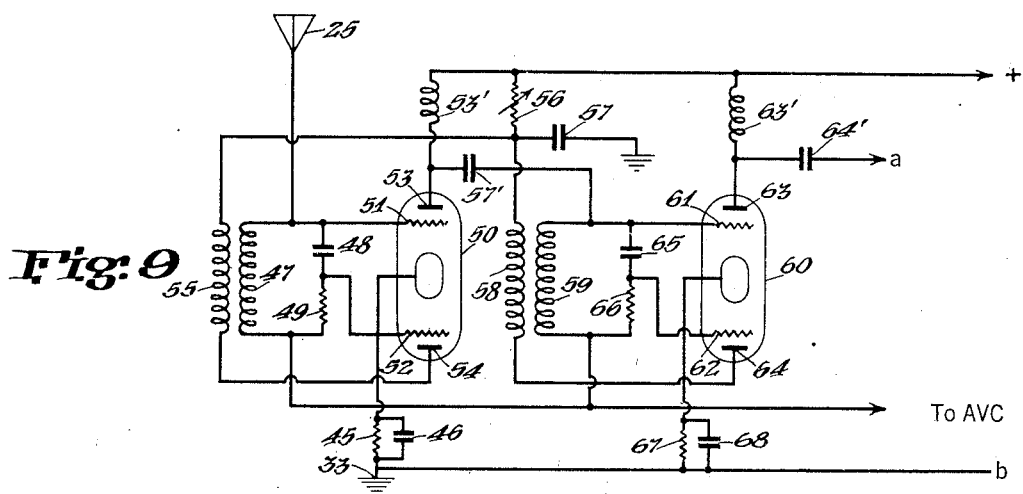
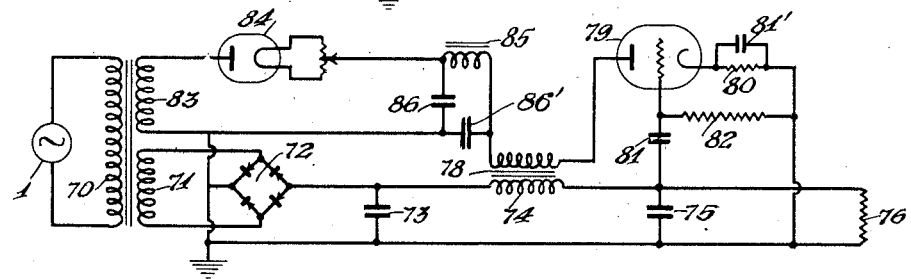
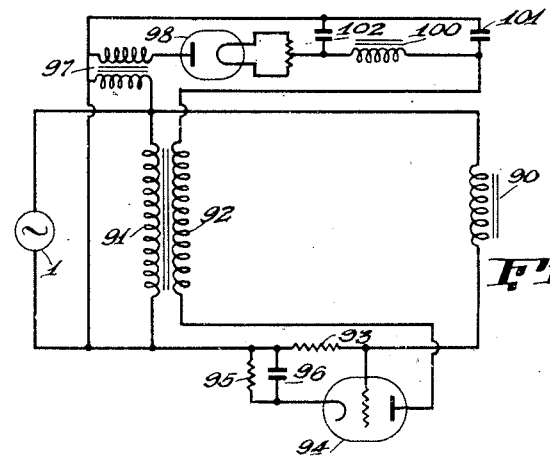
INVENTOR.
Jozef Plebanski
BY
ATTORNEY.

Patented Oct. 8, 1940

2,216,829

UNITED STATES PATENT OFFICE 2,216,829

ELECTRICAL SYSTEM

Jozef Plebanski, Warsaw, Poland, assignor to Radio Patents Corporation, New York, N. Y., a corporation of New York Application April 11, 1936, Serial No. 73,865
In Poland April 26, 1935

1 Claim. (Cl. 250—40)

My present invention is concerned with the provision of a system for and a method of varying the reactive impedance in an alternating current circuit without using a mechanically adjustable variable reactance element such as a variable capacitor or a variable reactor.

One object of the invention is the provision of means for and a method of varying the apparent reactance in an alternating current circuit purely electrically by the adjustment or variation of an auxiliary electric current or potential.

Another object is to vary the apparent capacitative reactance in an alternating current circuit purely electrically by the adjustment or variation of an auxiliary electrical current or potential.

A further object is to vary the apparent inductive reactance in an alternating current circuit purely electrically by the variation of an auxiliary electrical current or potential.

Another object is the provision of means for and a method of varying the capacitative and inductive reactance in an alternating current circuit within a wide range from "positive" to "negative" reactance values.

Another object is to provide a means for and a method of varying the tuning of an oscillatory circuit purely electrically by adjusting an electric current or potential.

A further object is to increase the apparent inductive reactance of a choke coil without increase of its physical characteristics and dimensions.

Another object is to control the phase angle in an alternating current circuit by purely electrical means for power correction purposes and the like.

The invention has other objects in view which will appear hereafter in the detailed description thereof in connection with the accompanying drawings in which I have shown and illustrated by way of example several practical embodiments and methods for practising the invention.

In the drawings wherein similar reference numerals identify similar parts throughout, Figure 1 illustrates a basic circuit arrangement according to the invention for controlling the inductive reactance in an alternating current system. Figure 2 is a similar arrangement adapted for control of the capacitative reactance. Figure 3 is a circuit combining the arrangements of both Figures 1 and 2. Figures 4 and 5 illustrate alternative arrangements to Figures 1 and 2. Figure 6 is a theoretical diagram explanatory of the function of the circuits. Figure 7 illustrates an example of the invention as embodied in an oscillator. Figure 8 illustrates the invention embodied in a radio receiver. Figure 9 illustrates a modification of a radio receiver embodying the invention. Figure 10 illustrates a rectifying and smoothing system with the inventive circuit embodied therein. Figure 11 shows the invention embodied in a power system for power factor correction.

With the above mentioned objects in view, the invention in general involves the provision of a regenerative circuit comprising an amplifier such as a vacuum tube amplifier or equivalent device having an operating or main circuit associated with its input, and a reaction or feedback circuit arrangement for reacting amplified output energy upon the main or input circuit. In contradistinction to the usual regenerative systems known in the art wherein the feedback potential is either in phase or 180° out of phase with the non-reactive potential in the main or input circuit resulting in an increase or decrease of the apparent non-reactive impedance or resistance of the circuit, I provide in accordance with the improvements of the present invention means associated with either the input or output circuit of the amplifier for shifting the phase of the feedback potential so as to be equal or dephased by 180° with the reactive potential in the input or main circuit; that is, with either the capacitative or inductive potential. In other words, in the ordinary regenerative circuit the reacting potential is in phase with the current or non-reactive potential drop resulting in an apparent increase or decrease of the non-reactive or loss resistance of the circuit. In an arrangement of the type according to the invention on the other hand, the reacting potential is in phase with the reactive potential drop in the circuit, or in other words, in phase quadrature either leading or lagging with the current flowing in the circuit. In this manner the apparent reactive impedance that is either the inductance or capacitance of the main circuit is varied resulting in a corresponding increase or decrease of the resultant effective reactance in the circuit.

Referring to Figure 1 of the drawings, I have shown a basic circuit of this character. Numeral 3 represents an inductance coil forming a tank circuit together with a condenser 4 and a resistance 5 and supplied with alternating current energy from a suitable source shown at 1 by means of a coupling coil 2. Item 6 illustrates an amplifying valve or equivalent device such as a vacuum tube amplifier having its grid-cathode path connected across the opposite ends of the resistance 5 and including a feedback or tickler coil in its output circuit arranged in inductive coupling relation with the inductance coil 3 of the main or input circuit. The valve 6 is connected in the usual manner to a high tension source as indicated by the plus and minus symbols.

In an arrangement of this character, it can be shown that the potential induced by the coil 7 in the circuit 3, 4, 5 is in phase quadrature with the current in the circuit in such a manner that the effect of the induced or reacting potential is equivalent to an increase or decrease of the apparent inductance of the circuit. As is understood, any other suitable means for shifting the phase of the reaction currents may be provided. Thus the resistance 5 may be omitted and the cathode grid path of the tube connected across the condenser 4 in the usual manner and a suitable phase shift device inserted in series with the reaction coil 7 to produce the desired dephasing.

Referring to Figure 2, this shows an equivalent arrangement for increase or decrease of the capacitative reactance of the circuit 3, 4, 5. To this end I have shown a feedback capacity connected between the anode of the valve 6 and the input circuit. The grid of the valve may be suitably biased in a well known manner such as by means of a resistance 9 inserted in the cathode lead and shunted by the condenser 10. I have also shown a modified coupling arrangement from the resistance 5 to the grid of the valve 6 comprising a coupling condenser 11 and grid leak resistance 11' of known design. In order to effect a gradual increase or decrease of the apparent capacitance of the circuit I have shown the center point of the resistance 5 connected to ground or negative potential and a variable contact 12 cooperating with the resistance 5 for adjusting the control potential applied to the grid of the valve. In the example shown, if the contact 12 is moved in the direction to the right from the center point 13, the apparent capacitative reactance of the circuit is increased, and vice versa, by moving the contact 12 in a direction towards the left from the point 13, the apparent capacitative reactance of the circuit decreases. Item 14 represents a drop resistance in the anode lead for securing the proper anode potential for the valve in a manner well known.

Figure 3 shows a circuit combining the arrangements of Figures 1 and 2 for simultaneously varying both the apparent or virtual capacitative and inductive reactance.

The behavior and function of the circuit described is further explained by the following. Assuming S to be a coefficient depending on the characteristics of the valve 6, and assuming further for simplicity that the valve has a linear grid voltage-anode current operating characteristic, then the theoretical equation for the circuit 3, 4, 5 will be as follows $$iR + (L \pm M\ RS)\frac{di}{dt} + \left(\frac{1}{C} \pm \frac{RS}{C_1}\right)\int i\,dt = E \sin \omega t$$

wherein $i$ represents the current in the circuit, R the value of the resistance 5, L self inductance of the coil 3, M the co-efficient of mutual inductance between the coils 3 and 7, C the capacitance of the condenser 4, $C_1$ the capacitance of the condenser 8, E the electromotive force impressed from the source 1, and $\omega$ the angular velocity of the current.

From this formula it is apparent that the "wattless" or 90° dephased reaction may completely change the tuning characteristics of the circuit. It further follows that such a reaction provides a means for artificially introducing into a circuit a positive or negative inductance ($\pm MRS$) or a positive or negative capacitance $$\left(\pm \frac{C3}{RS}\right)$$

which may be either added or subtracted from the real inductance L or the real capacity C of the circuit. By this method it is possible to vary the tuning of the circuit in a simple manner such as by adjusting the contact 12 within wide limits without changing the inductance coil and without range switching required in tuning methods known in the art.

The tuning of the circuit 3 4, 5 can be effected in various manners by a vibration of the amplification or gain of the valve 6, such as by variation of grid voltage as shown in the drawings or by varying the screen grid potential, the anode potential or by any other gain control method.

It is furthermore possible by using a system described by the invention to secure a "negative" inductance or capacity if the negative feedback potential is greater than the corresponding positive reactive potential in the circuit in a manner similar to the creation of a "negative" resistance obtained by the ordinary methods of regeneration heretofore known in the art. Such a circuit with a "negative" reactance that is either "negative" inductance or "negative" capacitance behaves in just the opposite manner to similar circuits with respective positive circuit constants. Thus, as is well known, a circuit with positive inductance and capacity will become a self oscillator if the resistance in the circuit is "negative." A circuit with "negative" inductance and capacity however will oscillate only if the resistance in the circuit is positive, but will not oscillate if the resistance is "negative." The resonance curve of such a "negative" circuit, that is a circuit in which both inductance capacitance and resistance are negative, is nearly the same as for a "positive" circuit in which both inductance capacitance and resistance are positive, the only difference consisting in a dephasing of the currents by 180°.

Referring to Figure 6, I have illustrated a resonance curve showing the current $i$ in a positive circuit as a function of the angular velocity and the phase angle therefor $\varphi$ these curves being well known to those skilled in the art. $\varphi'$ represents the phase angle for a negative circuit and $\varphi''$ the phase angle for a circuit having both negative inductance and capacitance but positive resistance. A circuit of the latter type will become an oscillator in a manner similar as a circuit with both positive inductance and capacitance and negative resistance.

As will be understood, it is further possible by means of an arrangement according to the invention to secure practically zero capacity or inductance in a circuit. In the former case the inherent capacity of a self inductance coil can be completely balanced by a corresponding negative capacity supplied by means of a tuning valve in a system as described. Such a circuit or coil will develop a maximum A. C. potential at its terminals.

The invention has also great uses in short wave systems as is understood where comparatively small capacities are required which have to be adjusted gradually and within very fine limits. Tuned coils with compensated inherent capacity may also be provided with great advantage in radio receivers to secure maximum amplification and maximum selectivity especially for the shorter wave lengths.

Referring to Figure 7, I have shown a vacuum tube oscillator for use in a transmitter and the like provided with a purely electrical tuning system according to the invention. The oscillator shown comprises a valve 20 of the self-oscillating type having a grid tank circuit 3, 4, 5 in which sustained oscillations are maintained by a regenerative arrangement of any known type such as a feedback coil 21 inserted in the anode circuit. The valve 6 which serves as the tuning valve has its grid-cathode path connected to a portion of the resistance 5 in a manner similar as described in the previous figures and a feedback coil 7 inserted in its anode circuit and inductively coupled with the inductance coil 3 of the oscillating circuit. In this manner it is possible to adjust the tuning or wave length of the circuit 3, 4, 5 by varying the amplification of the valve 6 such as by adjustment of the variable contact of the resistance 5. The oscillations produced in the circuit 3, 4, 5 may be transmitted to an output or utilization circuit such as a transmitting antenna wire line, etc., through the coupling coil 2.

Referring to Figure 8, this illustrates the invention embodied in a radio receiving system for tuning a receiver to the wave length of a transmitting station. Item 25 represents a receiving antenna connected in series with an antenna coupling condenser 26, a tank circuit comprised of an inductance 28 and a condenser 29 in parallel and ground 33 in the usual manner known in the art. The receiving currents set up in the tank circuit 28, 29 are applied to the control grid of an amplifying tube 30 supplied from a suitable high tension source as indicated by the + symbol. The grid of the tube is negatively biased by the provision of a voltage drop resistance 31 in the cathode lead shunted by a condenser 32. Item 35 represents a high frequency choke coil connected between the anode of the tube 30 and the high tension source and serving to develop high signal potential variations at the anode to be applied to a following stage of amplification connected between points a and b through a coupling condenser 34. In order to tune the circuit 28, 29 to the wave length of a desired transmitter, I have shown a tuning system of the character as previously described comprising a tuning valve 40 for controlling the apparent reactance of the circuit 28, 29. To this end the tuning valve 40 has its grid-cathode path connected to a portion of a resistance 39 included in a resonant input circuit comprised of an inductance 37 and condenser 38 and controlled from the output of the valve 30 through the coupling condenser 34. Items 41 and 42 represent a resistance and shunt condenser inserted in the cathode lead of the valve 40 for securing proper negative grid bias. The anode circuit of the valve 40 connected to the positive pole of the high potential source includes a pair of feedback coils 36 and 44 arranged in inductive coupling relation with the inductance 37 and 28 of the input circuits for the valves 40 and 30 respectively. In the example shown, the feedback coils 36 and 44 are connected in parallel, the latter further having a resistance 43 in series therewith. In this manner, both circuits 28, 29 and 37, 38 may be tuned by a single control operation, such as by adjusting the variable contact of the resistance 39. The value of the resistance 43 should be chosen in such a manner as to decrease the current of the tuning valve 40 in the same ratio as the amplifying valve 30 amplifies the signalling currents.

Referring to Figure 9, I have shown a radio receiving system wherein a separate tuning valve is provided for each amplifying stage. The amplifying and tuning valves are shown enclosed in a common envelope in a manner similar to the known multi-purpose valves now being used. In the circuit two amplifying stages have been shown, the first stage comprising a composite amplifying and tuning valve 50, and the second stage comprising a composite valve 60. The valve 50 has a common cathode, a pair of grids 51 and 52, and a pair of anodes 53 and 54 arranged in a suitable manner such as known in the construction of multi-purpose valves. The cathode, grid 51 and the anode 53 form the amplifying section and the cathode, grid 52 and anode 54 form the tuning section. Similarly the valve 60 comprises a cathode, a pair of grids 61 and 62, and pair of anodes 63 and 64, the cathode, grid 61 and anode 63 forming the amplifying section and the cathode, grid 62 and anode 64 forming the tuning section. A circuit of the character according to Figure 9 is well suited for securing automatic volume control as will be described later.

The antenna circuit includes a resonant or tank circuit comprising a self inductance 47 shunted by a capacity 48 in series with a resistance 49. The cathodes of the tubes 50 and 60 are shown connected to ground 33 or negative reference point of the system through voltage drop resisters 45 and 67 shunted by condensers 46 and 68 respectively. The tuned input circuit 47, 48 is shown directly connected across the grid-cathode path of the amplifying section of the tube 50 through a suitable coupling device for introducing an automatic volume control potential (indicated at AVC), and the grid 52 of the tuning section of the valve 50 is connected to the junction point of the condenser 48 and the resistance 49 of the resonant circuit in a manner similar as described in the preceding figures. The anode 53 of the tube 50 is shown connected to the positive terminal of a high potential source through a high frequency coupling choke 53' while the anode 54 of the tuning section of valve 50 is shown connected to the positive pole of the high tension source in series with a voltage drop resistance 56 and a feedback coil 55 in inductive coupling relation with inductance 47 of the resonant input circuit. Item 57 is a decoupling condenser for the resistance 56 connected between its lower end and ground. The signal potential variations developed at the anode 53 are applied to the valve 60 through a coupling condenser 57' in the manner similar as described in Figure 8. The resonant circuit for the valve 60 comprises an inductance 59 shunted by a condenser 65 in series with a resistance 66. The grid 61 of the amplifying section of tube 60 is connected to the upper terminal of the resonant circuit while the grid 62 of the tuning section of valve 60 is connected to the junction between the condenser 65 and the resistance 66. The anode 63 of the amplifying section is connected to the positive pole of the high tension source through the coupling choke coil 63' similar to the choke coil 53' of valve 50. The anode 64 of the tuning section is connected to the positive terminal of the high tension source in series with the variable resistance 56 and a feedback coil 58 arranged in inductive coupling relation with the coil 59 of the resonant circuit. Thus, the voltage drop resistance 56 forms a common part of the anode circuits of both tuning sections of valves 50 and 60 and serves for varying the anode potentials applied to the tuning sections to vary the amplification and accordingly the degree of "wattless" reaction upon the resonant circuits 47, 48, 59 and 65. In this manner the circuits are simultaneously tuned by a single or unicontrol element common to all tuning valves (resistance 56). The tuning resistance may be made in the form of a long flat spiral provided with a sliding contact adapted to short circuit a part of the resistance. In this manner an easy and accurate tuning can be effected over a comparatively wide range of wave lengths without requiring any range switching operations. The signal potential developed at the anode 63 may be utilized in any desired manner through a coupling condenser 64' and applied to a further amplifier stage or any other translating device connected to points a and b, as the case may be.

As described hereinbefore, the reactive regeneration is obtained by inserting an ohmic resistance in the resonant circuit to secure a 90° dephasing of the reacting potential. As pointed out, any other phase shift arrangement may be used in connection with the invention. If the grid is coupled to the resonant circuit in the ordinary manner and a phase shift device is included in the anode circuit, the latter should be of such construction as to insure an even phase shift of 90° for a wide band of frequencies if it is desired to use the system for tuning purposes.

The alternative arrangement for securing a 90° phase shift of the reacting potential is shown in Figures 4 and 5. In the latter the resonant circuit is connected with the grid-cathode path of the tuning valve in the usual manner and the reacting or feedback path from the anode circuit connected to such a point in the resonant circuit so as to secure the required phase quadrature between the current and the reacting potential. Thus, according to Figure 4, the feedback path including a condenser 8 is connected to the junction between the inductance 3 and resistance 5 and in the arrangement according to Figure 5, the anode of the tuning valve is connected to the junction between the condenser 4 and resistance 5 with a suitable bi-pass condenser 4' connected between the remaining end of the resistance 5 and the inductance 3.

The resistance 5 may have a small value. Assuming $R_0$ to be the total loss resistance of the resonant circuit, the insertion of the additional resistance has for its object only to secure an ohmic potential drop impressed upon the grid control of the tuning valve. The total ohmic drop at resonance is therefore equal to I $(R_0+R)$ where I is the current flowing in the circuit. This total drop is equal to E which is the electromotive force acting in the circuit. As is understood, it is never possible to secure a greater grid potential than E, and not even this value on account of the drop through the resistance 5. The latter should therefore be greater or equal than $R_0$ whereby the maximum potential available for the tuning valve is equal to or greater than E/2. Thus, if $R_0$ is equal at 10 ohms, $R_1$ may be also 10 ohms or 20 ohms or more.

The provision of the resistance 5 increases the damping of the circuit. This drawback however may be minimized or eliminated by reducing the apparent capacity and/or increasing the apparent inductance of the circuit by the method in such a manner that the damping is considerably reduced to offset the effect of the additional resistance 5 since the damping in the circuit is proportional to C and R and inversely proportional to the inductance L as is well known to those skilled in the art.

By using a system as described by the invention, it is possible to secure circuits having such a low damping as it is otherwise impossible to obtain, especially for the higher frequencies by decreasing the apparent capacity and increasing the apparent inductance to extremely small and large values respectively.

As is understood from the above, the invention has manifold other uses, and may serve for frequency modulation, phase modulation, or in general, for any system or method utilizing or based on a variable reactance in an alternating current circuit. Thus, for instance, the system described in Figure 7 may be used for producing a frequency modulated output current by varying the amplification of the tuning valve 6 in accordance with a modulating signal such as by means of an audio transformer 16 having a secondary inserted in the grid circuit and a primary connected to the output of a suitable modulating source such as a microphone circuit or the like.

Referring to Figure 10, I have illustrated a further embodiment of the invention as applied to a rectifying system for producing substantially steady direct current from an alternating current source. The system disclosed comprises the usual elements of an alternating current source shown at 1, a rectifying system 72 in the example shown comprising four rectifying devices such as heavy current metal rectifiers arranged in a Wheatstone bridge in a known manner with one diagonal branch of the bridge circuit connected to the input or alternating current circuit through a transformer having a primary 70 and secondary 71 and with the remaining diagonal branch connected to a load indicated at 76 through a smoothing filter. The latter, in the example shown comprises a series inductance coil 74 and a pair of parallel condensers 73 and 75. When using a system of this type for supplying heavy rectified currents, the dimensions of the smoothing filter, especially the choke coil 74, necessary for securing a steady and smooth output current and the costs become prohibitive for most practical cases. This drawback can be overcome in the arrangement shown by a system for increasing the apparent inductance as described by the invention and comprising in the example shown a reaction valve 79 which may be either a high vacuum or a gas filled valve and has its grid controlled from the load or output circuit of the rectifier through a usual coupling arrangement comprising a coupling condenser 81 and grid leak resistance 82. Items 80 and 81' represent the usual voltage drop resistance and shunt condenser inserted in the cathode lead for securing the desired negative grid bias. The anode of the reaction valve 79 is shown to be supplied from a separate high tension source comprising a one-way rectifier 84 connected to the input circuit through an auxiliary transformer winding 83 of the primary 70 and in series with a suitable smoothing filter comprising a series choke coil 85 and parallel condensers 86 and 86' and a feedback or reaction coil 78 in inductive coupling relation with the filter choke coil 74. The filter coils 85, 86 have considerably smaller dimensions than the choke coil 74, since the current through the reaction valve has a considerably smaller value compared with the output current of the rectifier. In this manner the apparent inductance of the choke coil 74 may be increased to considerable values suited for smoothing out heavy direct currents without prohibitive increase of size and cost of apparatus required.

Referring to Figure 11, this illustrates another example of practising the invention relating to the correction or compensation of the power factor in an alternating current system. I have again shown an alternating current source which may be an ordinary power circuit or network supplying an inductive load indicated at 90. The correcting system for applying a leading current to the circuit for compensating the inductive or lagging current caused by the load 90 is shown to comprise a small series resistance 93 connected across the grid-cathode path of a reaction valve 94 to secure the desired 90° phase shift similar as described in the preceding examples. Items 95 and 96 are the usual drop resistance and parallel condenser inserted in the cathode lead for securing proper negative grid bias. The anode circuit of the valve 94 includes a reaction inductance coil 92 arranged in inductive relation with an inductance coil 91 connected in the primary or main circuit the power factor of which is to be corrected. The anode potential for the valve 94 is supplied by a separate source comprising a one-way rectifier 98 connected to the main circuit through a transformer 97 and including a smoothing filter comprising a series choke coil 100 and parallel condensers 101 and 102. In the example illustrated, the compensating transformer 91, 92 is connected in parallel to the source 1 or load 90 and it is understood that similar results are obtained by connecting the primary 91 in series with the circuit.

As is evident from the above, the invention is not limited to the specific embodiments disclosed and described, but the underlying principle is susceptible to numerous variations and modifications differing from the exemplification shown and described herein for illustration in accordance with the broadest scope and principle of the invention as defined in the appended claim.

I claim:

A radio circuit comprising a first valve, a resonant input circuit and an output circuit therefor, a second valve, a second resonant circuit connecting the output circuit of said first valve with the input of said second valve, said second resonant circuit including a non-reactive impedance element in series for supplying the control potential for said second valve, feedback circuit paths from the output of said second valve to said resonant circuits, and means for controlling the amplifying gain of said second valve.

JOZEF PLEBANSKI.